(No Model.)
M. L. ROSSVALLY.
FIRE ESCAPE.
No. 306,526.  Patented Oct. 14, 1884.
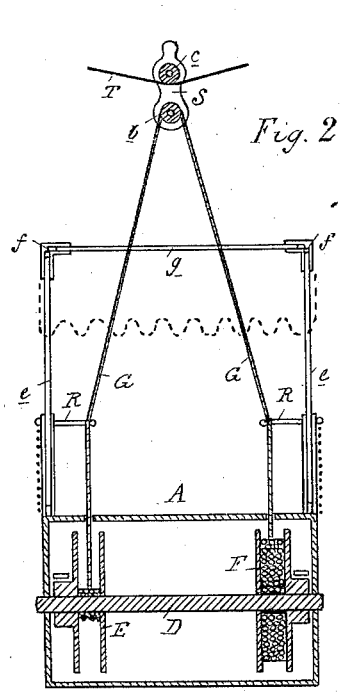
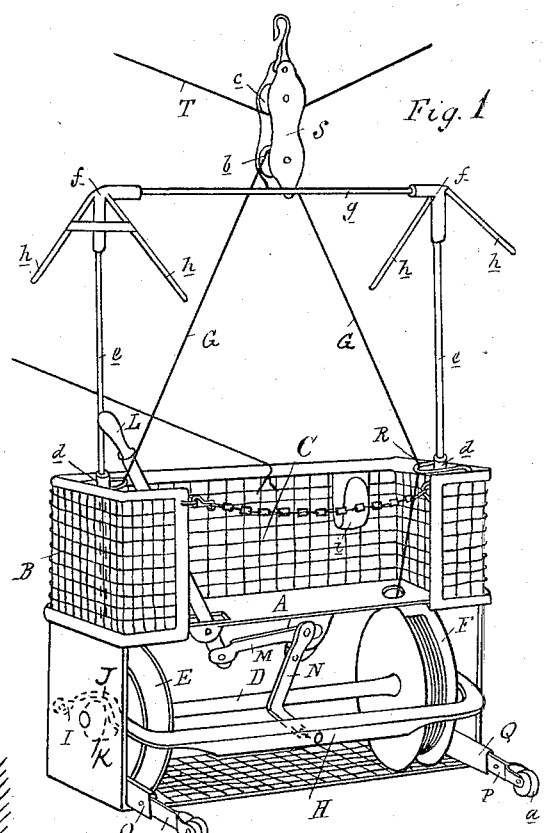
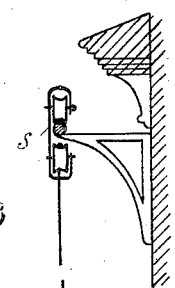
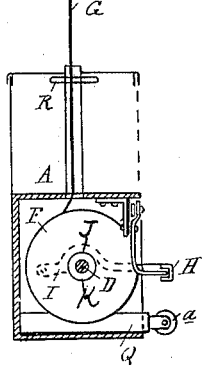
Attest
J. Paul Mayer
Inventor
Max L. Rossvally
By Thos. L. Sprague Atty

UNITED STATES PATENT OFFICE.

MAX LOUIS ROSSVALLY, OF BROOKLYN, NEW YORK, ASSIGNOR TO ANTONIO DOUDERO, OF DETROIT, MICHIGAN.

FIRE-ESCAPE.

SPECIFICATION forming part of Letters Patent No. 306,526, dated October 14, 1884.

Application filed June 20, 1884. (No model.)

*To all whom it may concern:*

Be it known that I, MAX L. ROSSVALLY, of Brooklyn, in the county of Kings and State of New York, have invented new and useful Improvements in Fire-Escapes; and I do hereby declare that the following is a full, clear, and exact description thereof, reference being had to the accompanying drawings, which form a part of this specification.

This invention relates to an improvement in a combined fire-escape and painter's scaffold; and the invention consists in the arrangement and combination of its parts, all as hereinafter described.

Figure 1 is a perspective view of my apparatus. Fig. 2 is a central vertical section thereof, and Fig. 3 is a vertical cross-section.

In the accompanying drawings, which form a part of this specification, A is a platform, scaffold, or seat for the use of the operator. It is surrounded by a substantial guard or railing, B, which, for the sake of the proper strength, lightness, and safety, I prefer to make of large-meshed wire screen. The shape of this platform may be oblong, as shown in the drawings, so as to give the operator sufficient elbow-room for working; or, if the device is to be used mainly for a fire-escape, it may be made in the shape of a basket, and such material as wickerwork may then be used in its construction. On one side of the railing is provided an opening, C, to give the operator convenient access, and this opening is provided with a chain, guard, strap, or other equivalent, to close or disclose the opening at will and admit of the operator seating himself on the platform, if desired.

D is a shaft, suitably journaled upon its ends below the platform and in the direction of its length.

E and F are two like spools secured upon the shaft D near its ends.

G is a cable or rope, one end of which is secured to the spool E, while the opposite end is secured to the spool F in such a manner that when the shaft D is rotated this rope or cable will unwind from one spool while it is simultaneously wound up by the other spool.

H is a bail pivotally secured at each end, at I.

J are brake-shoes secured to or formed near the pivotal ends of the bail, and K are friction-pulleys secured upon the shaft D, and forming, in connection with the brake-shoes J, a friction-brake for the shaft D.

L is the brake-lever arranged in proper proximity to the operator upon the platform. The lower end of this brake-lever is connected by a link, M, to a lever, N, the opposite end of which engages into a loop, groove, or slot, O, in the bail, the parts being so arranged that the oscillation of the brake-lever L will raise or depress the bail H at the will of the operator, and thereby produce the application or release of the brake-shoe.

P are outriggers, adjustably secured in any convenient way in the sockets Q, so that they may be more or less projected. The outer ends of these outriggers are provided with little rollers *a*.

R are guide-loops, through which the cable or rope G is passed at each end of the railing D.

S is a double sheave, from which the whole device is suspended by means of the cable G, which passes over the lower pulley, *c*.

In practice, if the apparatus is to be used for a painter's scaffold, the sheave S is suspended from a cable or rope, T, which is securely fastened upon its end, so that the device can be freely moved laterally along the wall of a building in the usual manner.

In Fig. 1 the apparatus is shown near its highest position, and nearly all the cable G is wound upon the spool F, while the spool E is nearly empty. Above the platform the cable G forms two sides of an equilateral triangle the apex of which is at the point of suspension. If the brake is now released, the combined weight of the platform and operator will cause the apparatus to descend, as the spool F, owing to the large coil of rope upon it, has the advantage over the spool E, which is nearly empty, and by revolving the shaft D will unwind more rope from it than the other spool can wind up, but the descent of the platform is not like the one of a falling body, but will be quite steady, and finally come to a stop when the point is reached where the unwinding capacity of the spool F becomes equal to the winding capacity of the spool E. If the operator wants to stop at any point before the apparatus stops itself, he simply applies the brake. If the operator wishes to raise the apparatus, he takes firmly hold of the rope G on that side of the triangle which connects with the spool F, and, by raising his weight off the platform, the shaft D will be caused to revolve, so as to unwind the rope on the spool E and wind it on the spool F, which, being the larger of the two spools, will wind more rope than is unwound from the other, thus causing the apparatus to rise. By pulling on the rope hand over hand, the whole apparatus can be quickly raised by the operator. When he wants to stop again, he quickly applies the brake.

From the foregoing description of the apparatus it will be seen that in order to effect a vertical displacement of the device the winding and unwinding capacity of one spool—say spool F—must be greater than that of the other, with the same number of revolutions. This condition can be easily obtained with the spools in question by making them rather short, and to save rope the diameter of the winding part of the spool should not be much larger than the diameter of the shaft D. The length of the rope or cable G will then have to be about three times as long as the height the platform has to traverse. The raising or lowering of the apparatus does not disturb the stability of the platform, as no tilting can take place owing to the arrangement of the guide-loops R, which will always tend to keep the platform horizontal, and therefore, as soon as one side of the triangle formed by the rope G is lengthened, the pulley $b$ of the sheave will admit of their being equalized. The outriggers P will hold the platform any required distance from a wall to prevent its catching upon projections, such as window caps or sills.

When my apparatus is intended to form a permanent attachment to a building, I dispense with the use of the cable T and arrange in its stead a permanent rail or track, which may be supported by brackets below the cornice of the building, and upon which the apparatus is supported by a traveling sheave.

When the apparatus is used as a painter's scaffold, it is often very desirable to shade the operator from the hot rays of the sun. For the purpose I have my apparatus provided with a removable shade constructed as follows: $d$ are sockets secured to the ends of the railing. $e$ are posts fitting into these sockets. $f$ are ankle-sockets into which the upper ends of the posts $e$ can be inserted, and which receive likewise the ends of the ridge-piece $g$. $h$ are rafters secured to the angle-sockets $f$. Thus a light and substantial frame is formed upon which a canvas roof is easily secured.

I am aware of Patent No. 294,908 and Reissue Patent No. 9,790, and make no claim to the construction shown therein as forming part of my invention, as in neither of them is the hoisting-cable constructed and arranged to wind from one spool to the other as the carriage ascends and descends.

What I claim as my invention is—

1. In an apparatus for the purpose described, the combination of a platform, seat, or basket, A, with the shaft D, supported therein and adapted to move therewith, the spools E F, secured upon said shaft, and the cable G, one end of which is secured to the spool E, and the other, after passing over a sheave, from which the device is suspended by means of said cable, secured to the spool F, substantially as and for the purpose specified.

2. In an apparatus for the purpose described, the combination of a platform, seat, or basket, A, with the shaft D, supported therein and adapted to move therewith, the spools E F, secured upon said shaft, the cable G, one end of which is secured to the spool E, the other, after passing over a sheave from which the device is suspended by means of said cable, being secured to the spool F, and a friction-brake operating on said shaft, substantially as and for the purpose specified.

3. In an apparatus for the purpose described, the combination, with a basket having a seat, of a friction-brake, and a pivoted bail, H, forming a foot-rail, and constructed and arranged to bear on said friction-brake, substantially as and for the purpose described.

4. In an apparatus for the purpose described, and in combination with the shaft D, journaled below the seat, and the spools E F, secured upon said shaft, the pivoted bail H, forming a foot-rail on one side of the device and carrying brake-shoes which are operated by the depression of said bail, substantially as specified.

5. In an apparatus for the purpose described, the combination, with the shaft D, having secured thereto the spools E F, and friction-rollers K, of the bail H, pivoted at each end and carrying brake-shoes K, the lever L, link M, and lever N, connected to said bail, substantially as and for the purpose specified.

6. In an apparatus for the purpose described, the devices for removably supporting a canvas roof thereon, the same consisting of the sockets $d$, end posts, $e$, angle-sockets $f$, ridge-piece $g$, and rafters $h$, all constructed and arranged substantially as set forth.

MAX LOUIS ROSSVALLY.

Witnesses:
H. S. SPRAGUE,
E. SCULLY.

It is hereby certified that in Letters Patent No. 306,526, granted October 14, 1884, upon the application of Max Louis Rossvally, of Brooklyn, New York, for an improvement in "Fire Escapes," the name of the assignee was erroneously written and printed "Antonio Doudero;" that said name should have been written and printed *Antonio Dondero* ; and that the proper correction has been made in the files and records pertaining to the case in the Patent Office, and should be read in the Letters Patent to make it conform thereto.

Signed, countersigned, and sealed this 11th day of November, A. D. 1884.

[SEAL.]

M. L. JOSLYN,
*Acting Secretary of the Interior.*

Countersigned:

BENJ. BUTTERWORTH,
*Commissioner of Patents.*